(12) United States Patent
Brosseau et al.

(10) Patent No.: US 8,256,482 B2
(45) Date of Patent: Sep. 4, 2012

(54) APPARATUS FOR COVERING AND GROUPING WIRES AND METHOD THEREOF

(76) Inventors: Mark Brosseau, Quebec (CA); Claude Rivest, Quebec (CA)

( * ) Notice: Subject to any disclaimer, the term of this patent is extended or adjusted under 35 U.S.C. 154(b) by 341 days.

(21) Appl. No.: 12/580,121

(22) Filed: Oct. 15, 2009

(65) Prior Publication Data

US 2010/0132878 A1 Jun. 3, 2010

Related U.S. Application Data

(60) Provisional application No. 61/136,926, filed on Oct. 15, 2008.

(51) Int. Cl.
 *B65H 81/00* (2006.01)
(52) U.S. Cl. ........ 156/431; 156/185; 156/187; 156/188; 156/190; 156/195; 156/425; 156/428; 156/429; 156/430
(58) Field of Classification Search .................. 156/184, 156/185, 187–190, 195, 425, 428–432
See application file for complete search history.

(56) References Cited

U.S. PATENT DOCUMENTS

| 5,355,787 A | * | 10/1994 | Burns et al. ................... 100/27 |
| 5,417,787 A | * | 5/1995 | Tanaka ......................... 156/187 |
| 7,373,863 B2 | * | 5/2008 | O'Banion et al. ................ 83/63 |

OTHER PUBLICATIONS

Patrick, Dale R.; Fardo, Stephen W. Rotating Electrical Machine and Power Systems ($2^{nd}$ Edition). pp. 331-332. Fairmont Presses Inc. © 1997.*
NTN Corporation, Cam Followers & Roller Followers, Catalogue No. 3604-VI/JE.

* cited by examiner

*Primary Examiner* — Khanh P Nguyen
*Assistant Examiner* — Carson Gross

(57) ABSTRACT

There is provided an apparatus for applying tape on a plurality of wire to form a harness thereof, the apparatus comprising a casing defining a fixed portion adapted to rotatably receive a moveable portion rotatable about a moveable portion axis, the moveable portion being adapted to secure a roll of tape thereon such that the roll of tape revolves with the moveable portion in a fashion allowing unwinding of the tape on the plurality of wires, the fixed portion and the moveable portion defining cooperating indentations encompassing the moveable portion axis, the indentation in the moveable portion being adapted to be selectively aligned with the indentation of the fixed portion to receive and allow positioning of the plurality of wires about the moveable portion axis such that the tape on the rotating moveable portion being unwounded on the plurality of wires to secure the plurality of wires in a harness.

17 Claims, 15 Drawing Sheets

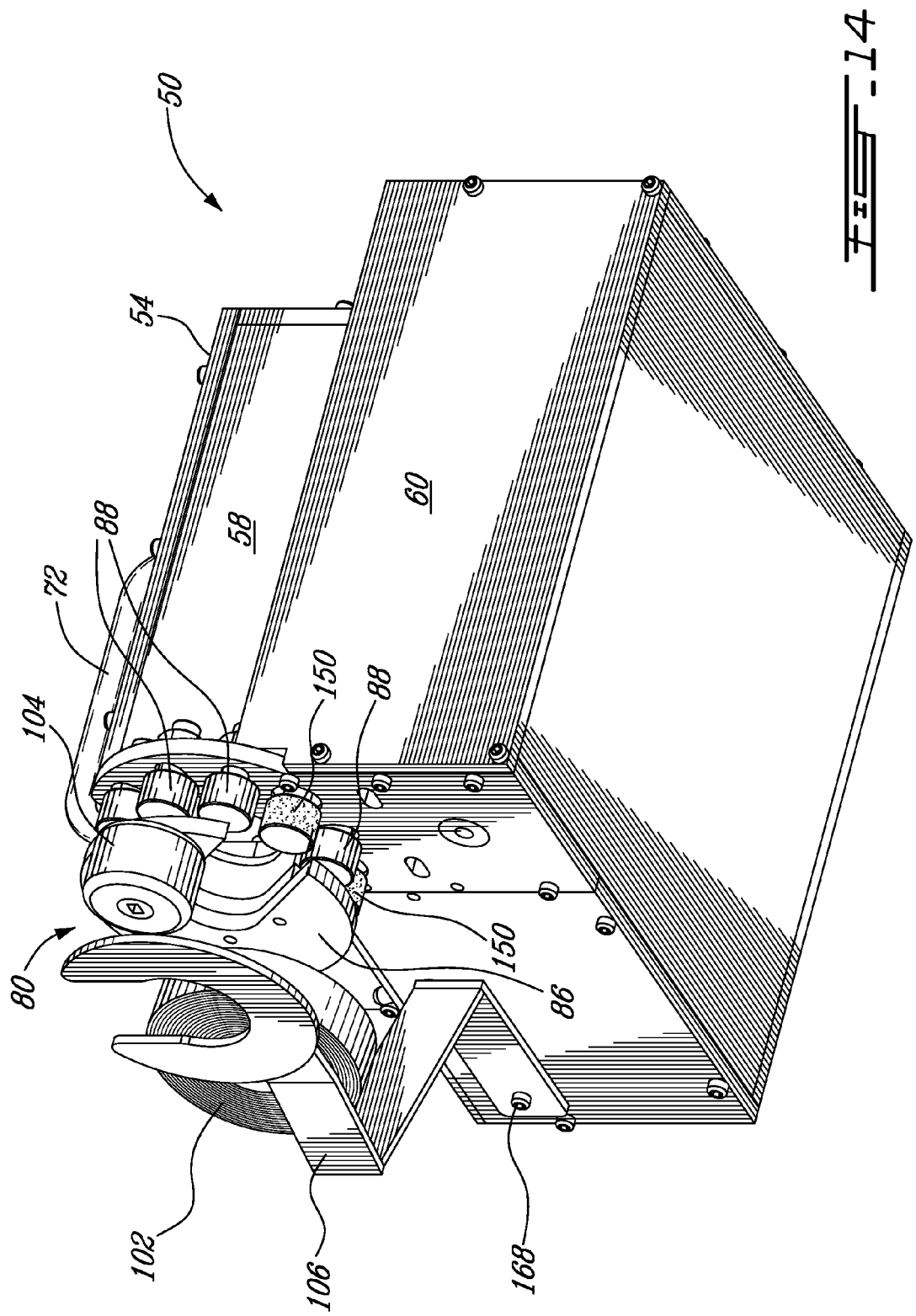

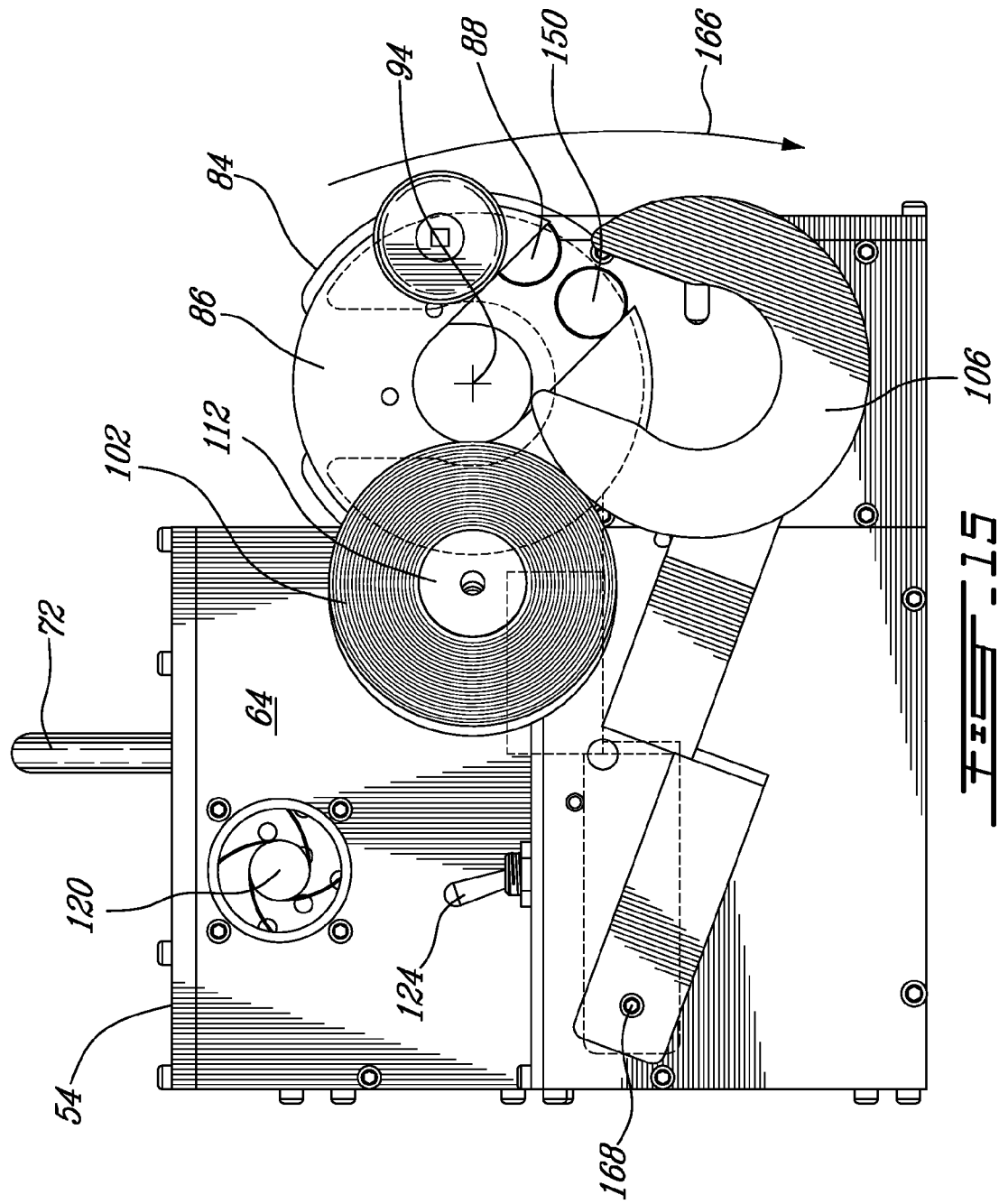

APPARATUS FOR COVERING AND GROUPING WIRES AND METHOD THEREOF

CROSS REFERENCE TO RELATED APPLICATION

This application claims priority on U.S. Provisional Application No. 61/136,926, filed on Oct. 15, 2008, which is herein incorporated by reference.

FIELD OF THE INVENTION

The present invention generally relates to an apparatus and a method for consolidating a bundle of cables. More precisely, the present invention is concerned with an apparatus and a method for consolidating a harness with a surrounding tape applied over the bundle of cables.

BACKGROUND OF THE INVENTION

Complex products or industrial equipments are using wires to channel power and control signals between various components therein. In modern vehicles, for instance, it is possible to find a significant number of wires or electric cables disposed between various electronic and electrical components. These cables need to be conveniently packaged in a harness to be safely and easily installed.

The harness has a generally arbitrary shape adapted to its unique use. The harness comprises nodes, from which branches of electrical wires project toward connection ends in order to interconnect each components such as lights, electronic boards, actuators and sensors. A harness can be more or less complex depending on the number of systems it has to interconnect.

The wires forming the harness are tied together with a protective layer disposed thereon. The protective layer is commonly a layer of tape that is installed over the group of wires to ensure that all wires routed similarly are joined together. Additionally, the tape can be discontinuously applied on over the wires to leave some desired area uncovered thus leaving direct access to the wires. If the harness provides a number of branches leading to various connection ends the branches are also protected with a layer of tape.

The tape can be manually installed over the bundle of wires. Alternatively, a machine can be used to apply significant amount of tape over the wires.

A prior art taping machine 10 is illustrated on FIG. 1. The taping machine 10 is a portable taping machine in the sense that it must be manually held by the user. The user grabs the handle 12, pass the group of wires to be taped together within the safety cover 14 through the aperture 16. For so doing, the aperture 16 needs to be aligned with the opened door 18 to have access to the central opening 20.

Once the group of wires is located in the central opening 20 the user press the actuation button 26 to power the motor 22 to rotate the central portion 24 of the taping machine 10. The central portion of the taping machine 10 accommodates a roll of tape (not visible on FIG. 1) to revolve the roll of tape about the group of wires to secure the group of wires together and form a harness of wires.

The illustrated prior art taping device 10 can be suspended by the hook 26 to reduce the weight supported by the user. Once the taping machine 10 is properly held and wires are disposed inside the central opening 20 the user actuates the rotation of the central portion 24 and slowly moves along the cables to wrap the desired portion of cables with tape.

Due to the complexity of certain harnesses having different lengths and number of branches a solution for automating the taping procedure in a sufficiently simple and viable manner has yet to be found. A problem with prior art solutions is the possibility of providing inconsistent quality and, therefore, in certain cases, defects in the harness. Another issue present with the prior art is that they need to be manually manipulated thus increasing the fatigue of the person operating the taping machine. One other downfall of prior art solutions is that the operator moves the machine as opposed to move the harness, which is usually lighter.

It would therefore be desirable to render the harness taping procedure less labor intensive, in a cost effective manner, whilst ensuring flexibility, simplicity and reliability. An improved apparatus and an improved method for taping wires to form a harness are therefore desirable over the existing art.

SUMMARY OF THE INVENTION

In accordance to the present invention, there is provided an apparatus and a method for applying a layer of tape over a group of cables, electric wires, communication wires and/or fiber optic cables to consolidate the group of cables/wires in a harness.

An aspect of the present invention provides a taping machine having a doorless central rotating portion.

Another aspect of the present invention provides a portable taping machine that can be easily disposed on a surface.

An aspect of the present invention provides a battery powered taping machine.

An additional aspect of the present invention provides a rechargeable mechanism adapted to recharge the battery and to selectively draw power from the grid to power the taping machine.

An aspect of the present invention provides a battery powered portable taping machine.

One other aspect of the present invention provides a taping machine having a vented enclosed structure.

Another aspect of the present invention provides a taping machine comprising a counter weight counter balancing the weight of the roll of tape when the roll of tape revolves about the moveable portion axis.

One aspect of the present invention provides a moveable portion held in place by a grooved portion defined therein in conjunction with a series of bearings engaging the grooved portion.

An aspect of the present invention provides a moveable portion that is rotated by at least one driven wheel engaging a grooved portion defined therein.

One aspect of the present invention provides a friction-enhancing surface on the driven wheel to increase the friction between the driven wheel and the grooved portion.

Another aspect of the present invention provides a safety lever laterally disposed from the moveable portion and adapted to influence the movement of the moveable portion when actuated.

One aspect of the present invention provides an array of moveable portion supports from which at least one is a bearing and at least one is a driven wheel adapted to apply motion to the moveable portion.

Another aspect of the present invention provide a tape roll support adapted to receive a tape roll, the tape roll support defining an axis that is not parallel with the axis defined by the moveable portion wherein the angle formed therebetween tend to force the taping motion toward the untaped portion of the wire to be taped. The tape roll support also provides an adjustable tension on the tape roll to provide a desired tension of the tape on the harness.

One additional object of the present invention provides a remote actuator to remotely actuate the taping machine; the remote actuator being preferably a pedal actuator to free the hand of the operator.

An additional objet of the present invention provides a variable speed taping machine wherein the revolving speed of the tape roll is variable.

An aspect of the present invention provides a belt drive mechanism adapted to couple the electric motor to the drive wheels.

One additional aspect of the present invention provides a clutch adapted to couple the electric motor to the drive wheels over a predetermine range of torque.

An other aspect of the present invention provides an apparatus for applying tape on a plurality of wire to form a harness thereof, the apparatus comprising a casing defining a fixed portion adapted to rotatably receive a moveable portion rotatable about a moveable portion axis, the moveable portion being adapted to secure a roll of tape thereon such that the roll of tape revolves with the moveable portion in a fashion allowing unwinding of the tape on the plurality of wires, the fixed portion and the moveable portion defining cooperating indentations encompassing the moveable portion axis, the indentation in the moveable portion being adapted to be selectively aligned with the indentation of the fixed portion to receive and allow positioning of the plurality of wires about the moveable portion axis such that the tape on the rotating moveable portion being unwounded on the plurality of wires to secure the plurality of wires in a harness.

Another aspect of the present invention provides a method for manufacturing a wiring harness, the method comprising aligning an indentation of a moveable portion with an indentation of a fixed portion; inserting a plurality of wires in the aligned indentations; and actuating a rotation of the moveable portion such that a roll of tape attached thereto revolves about the plurality of wires to tapedly secure the plurality of wires into a wiring harness.

An additional aspect of the present invention provides a taping apparatus adapted to apply tape on a plurality of wires to manufacture a wiring harness, the apparatus comprising a rotatable means adapted to rotate a roll of tape about the plurality of wires, the rotatable means further defining a doorless recess therein adapted to receive the plurality of wires therein, the recess being selectively accessible by rotating the rotating means.

The foregoing and other objects, advantages and features of the present invention will become more apparent upon reading of the following non-restrictive description of an illustrative embodiment thereof, given by way of example only, with reference to the accompanying drawings.

BRIEF DESCRIPTION OF THE DRAWINGS

In the appended drawings:

FIG. 14 is a perspective view of the taping machine of FIG. 2 partially viewed from the bottom; and FIG. 15 is a left side elevational view of the taping machine of FIG. 2 illustrating the movement of the safety arm.

DETAILED DESCRIPTION OF THE INVENTION

An apparatus for taping at lest one wire or a plurality of wires into a harness, and a method thereof, in accordance with a non-restrictive illustrative embodiment of the present invention, will now be described.

Figure 1:
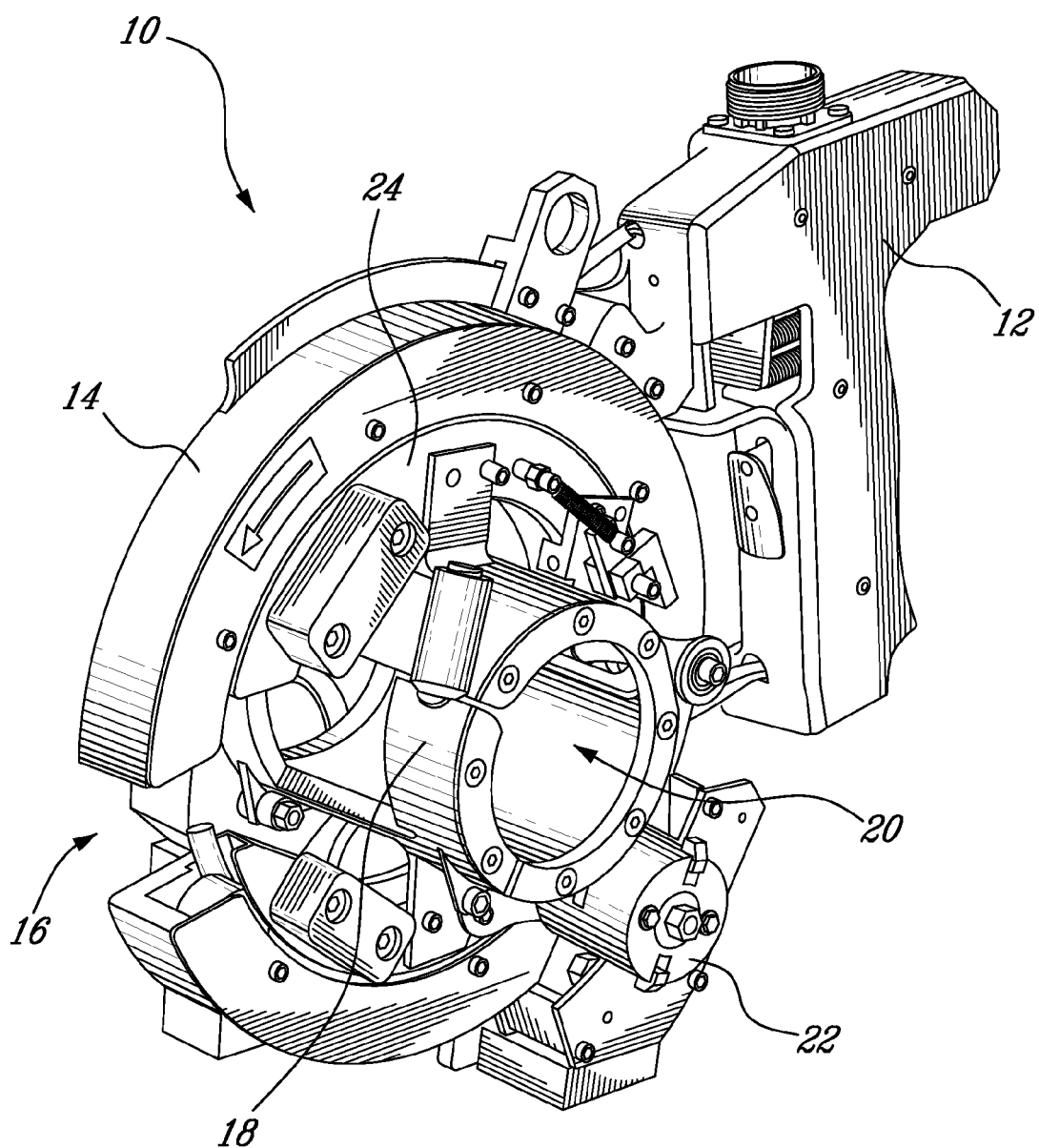
FIG. 1 is perspective view of a prior art taping machine.
Figure 2:
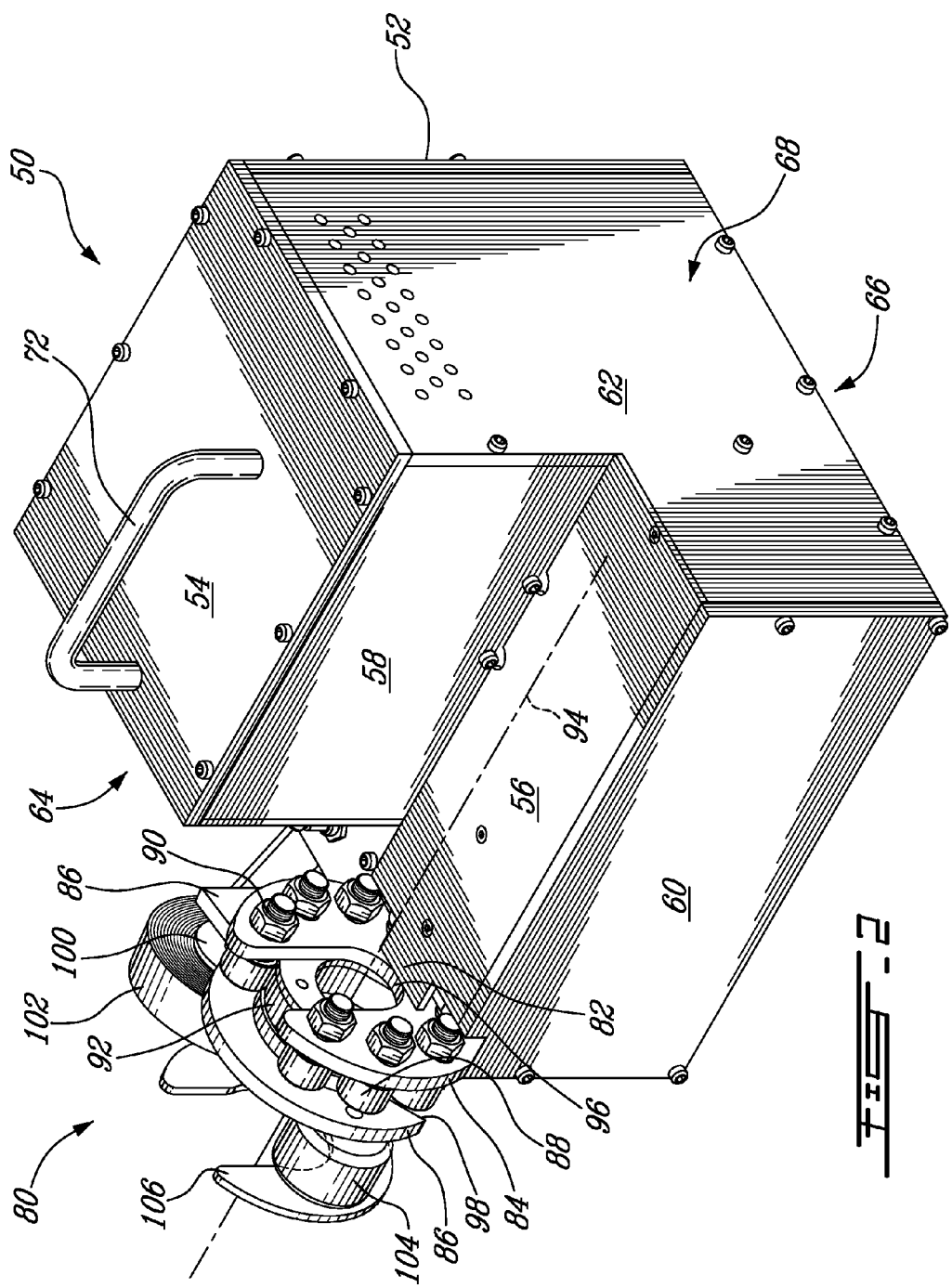
FIG. 2 is a perspective view of an illustrative example of a taping machine in accordance with the present invention.

An illustrative example of the taping apparatus of the present invention is shown on FIG. 2. The taping apparatus 50 comprises a casing 52 defining an upper top portion 54, a lower top portion 56, an upper front portion 58, a lower front portion 60, a right side portion 62, a left side portion 64 and a bottom portion 66. All these casing portions are illustratively made of sheet aluminum assembled together to form the casing 52 but could otherwise be made of another material without departing from the scope of the present invention. A fiber filled plastic casing is another option that would provide a reduced weight enclosure to the taping apparatus 50.

The taping apparatus 50 is transportable using the handle 72 secured to the casing 52. Other means for holding the taping apparatus 50 can be added to the actual embodiment in accordance with the possible dedicated uses of the taping apparatus 50. The taping apparatus 50 is also designed to rest on a table or a flat surface. A power pack 68, not visible on FIG. 2, is included in the casing 52 to remotely use the taping apparatus 50. The power pack 68 is a battery 74 in the present embodiment. A 12-Volt battery 74 is electrically connected to the DC motor (that will be discussed later in the description) that powers the taping apparatus 50. The battery 74 powers the taping apparatus 50 without requiring the taping apparatus 50 to be connected to the electric grid. However, the taping apparatus 50 can be used when the power pack 68 is connected to the electric grid. The taping apparatus 50 can be plugged in to the grid to recharge the power pack 68 with a removable wire removably connected into a connector located on the casing 52. The taping apparatus 50 can alternatively be powered from the grid if the battery is weak while the battery is recharging. A series of venting holes 70 are disposed on the right side portion 62 to allow air to access the interior of the casing 52 to vent and cool the power pack 68.

Still referring to FIG. 2, the casing 52 accommodates a cable receiving portion 80. The cable receiving portion 80 includes a lower top portion extension 82. The lower top portion extension 82 extends the lower top portion 56 toward the fixed portion 84 to reduce the gap that can be formed therebetween and help prevent wires to jam therein.

The cable receiving portion 80 further includes a fixed portion 84, a moveable portion 86 and an array of rollers 88 individually secured to the fixed portion 84 with a nut 90. The rollers 88 are miniature can follower as they can be found into NTN Corporation's Cam Followers & Roller Followers Catalogue No. 3604-VI/JE. The NTN catalog can be found at www.ntn.co.jp/English/products/pdf/camandroller/pdf/camandror_all.pdf The rotation of the moveable portion 86 is performed about a moveable portion axis 94. The moveable portion 86 defines a circumferential guide 92 adapted to receive a portion of the rollers 88 therein to rotatably axially secure the moveable portion 86 to the fixed portion 84. As best seen on FIG. 3, whenever a wire or a group of wires is taped with the machine, the wire(s) should ideally be located as close as possible to the moveable portion axis 94 to help ensure a more consistent tape wrapping over the wire(s) 112. In the present illustrative embodiment the taping apparatus 50 is provided with a cable receiving portion 80 defining an opening with a diameter of about fifty (50) millimeters. A smaller or larger receiving portion 80 is encompassed by the present invention if required by the size of the harness.

Still referring to FIG. 2 the fixed portion 84 defines a fixed portion indentation 96 while the moveable portion 86 defines an axially cooperating moveable portion indentation 98. Both indentations 96, 98 are encompassing the moveable portion axis 94 and are adapted to be aligned to receive the wire(s) to be taped therein. The rotation of the moveable portion 86 alternatively close the fixed portion indentation 96 and might need to be aligned in order to insert the wire(s) in the indentations 96, 98 along the moveable portion axis 94.

The moveable portion 86 further includes a tape roll support 100 adapted to receive a roll of tape 102 and a counterweight 104. The roll of tape 102 is disposed in such a way that the tape 114 (not visible on FIG. 2) can be unwound on the wire(s) put in the indentations 96, 98 along the moveable portion axis 94. The securing of the roll of tape 102 is adjustable to provide the desired tension on the tape when the tape is installed on the harness. The counterweight 104, disposed on the opposite side of the tape roll support 100, helps reduce the vibration provided by the weight of the roll of tape 102 when the moveable portion 86 revolves at a significant speed. A safety lever 106 is also visible and will be described in details later in the present description.

Figure 3:
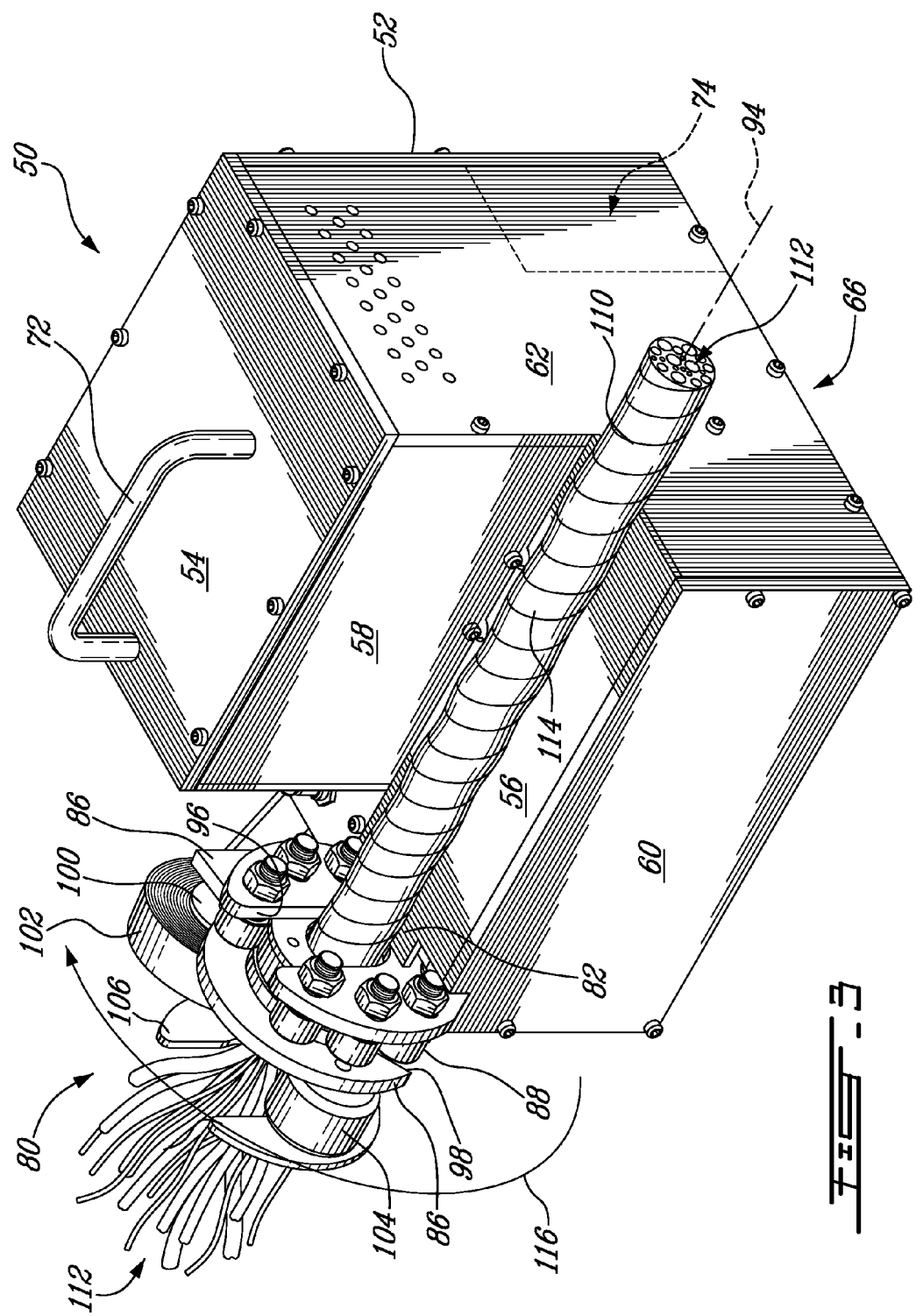
FIG. 3 is a perspective view of the taping machine of FIG. 2 with a group of wires.

Turning now to FIG. 3 illustrating the same taping apparatus 50 as FIG. 2 with the addition of a cable 110 installed thereon. The cable 110 is formed from a plurality of smaller wires 112 that are consolidated into a single bigger cable 110, or harness, once covered by the tape 114. The rotational movement of the moveable portion 86 is illustrated by arrow 116 on FIG. 3.

Figure 4:
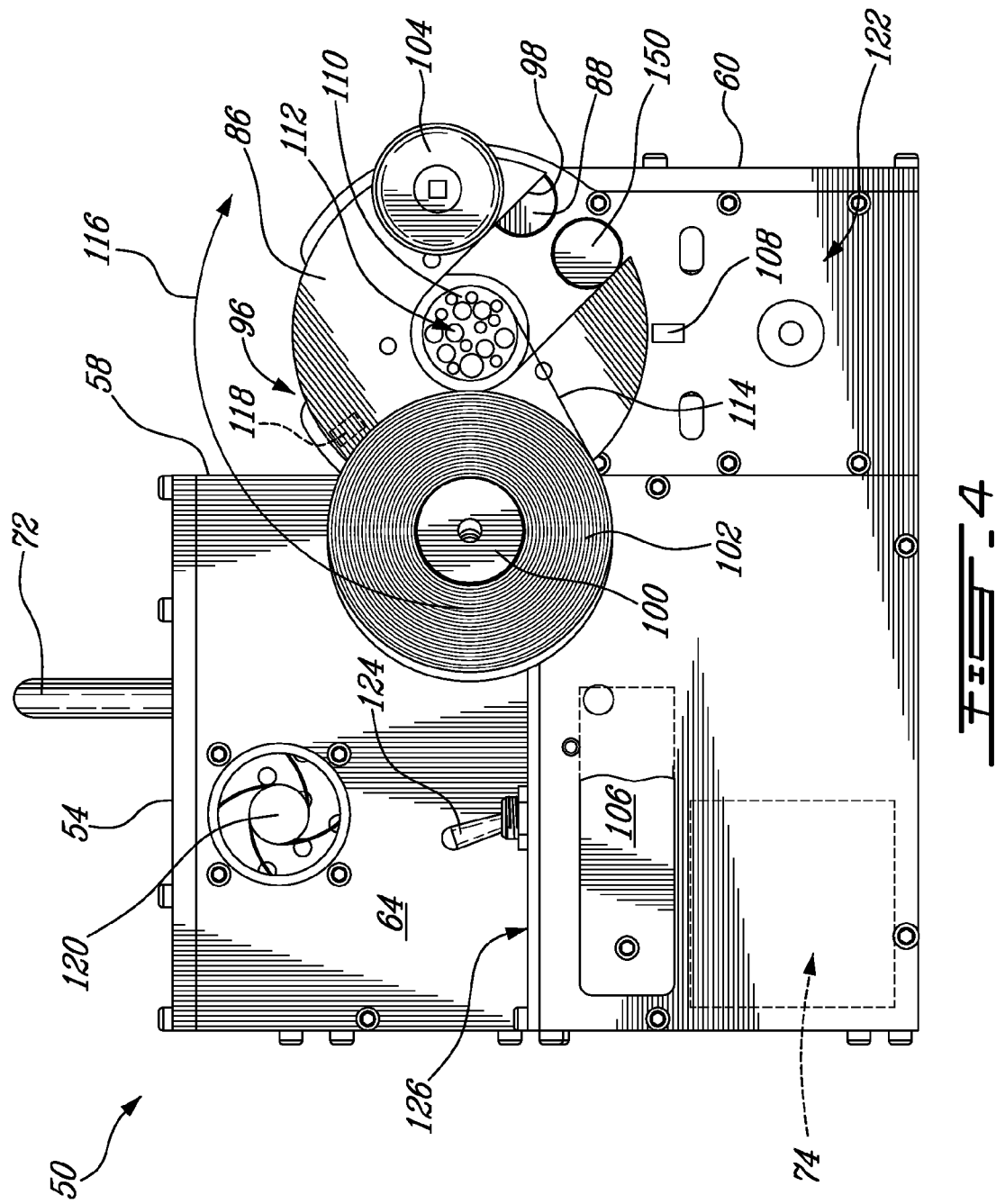
FIGS. 4-6 are left elevation side views of the taping machine of FIG. 2 illustrated at different stages of the taping process.
Figure 5:
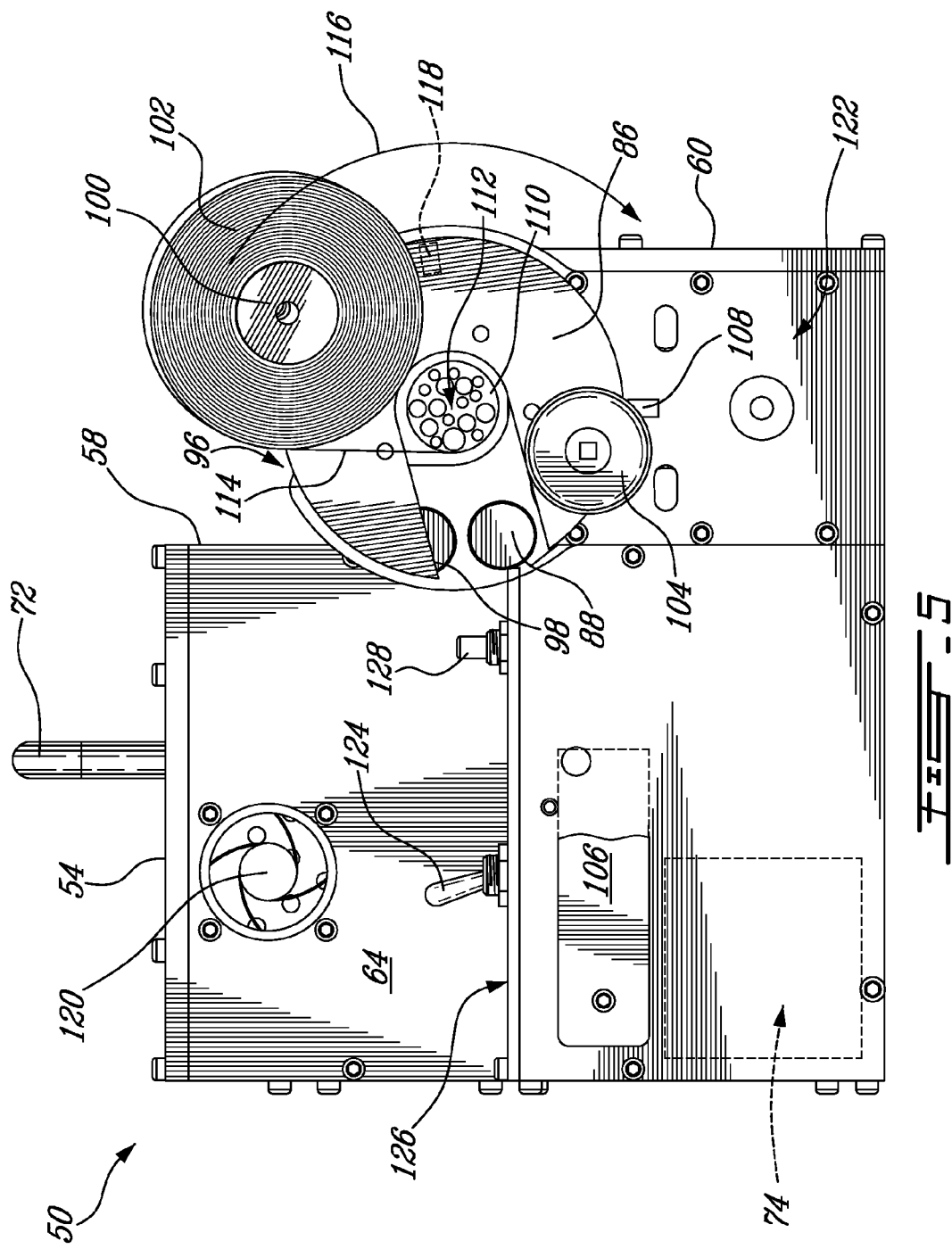
Figure 6:
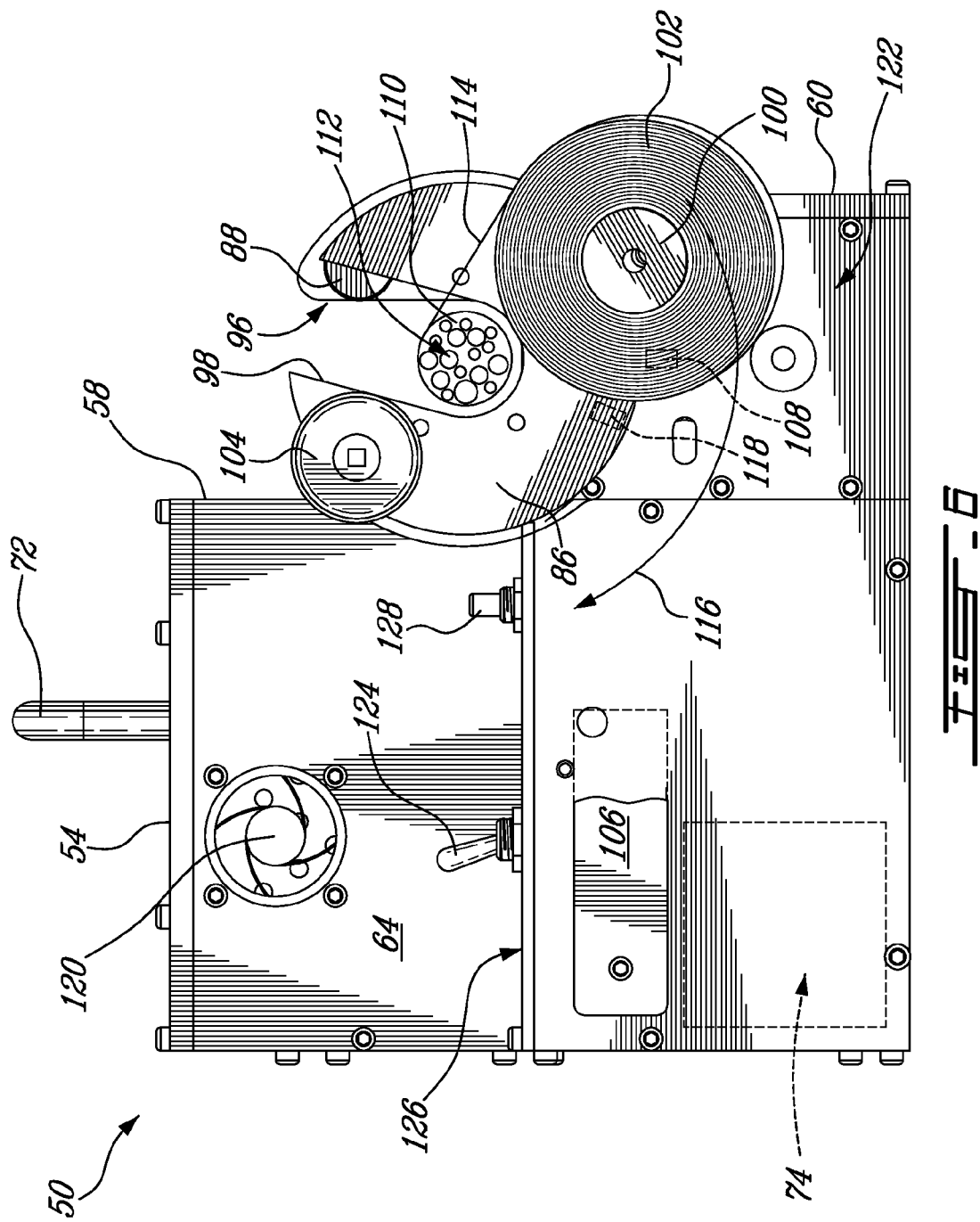

Referring now to FIGS. 4-6 where is illustrated the rotational movement, still illustrated by arrow 116, of the moveable portion 86 about the moveable portion axis 94. It is possible to appreciate the unwinding of the tape 114 from the roll of tape 102 over the plurality of small wires 112. Each time the roll of tape 102 performs a complete revolution about the wires 112 the tape 114 covers a portion of the length of the wires 112. The user longitudinally moves the wires 112 at a speed corresponding to the speed at which the tape 114 covers the wires 112. Once the desired portion of wires 112 is covered with tape 102 the user stop the taping apparatus 50, cut the tape 102 and remove the wire from the aligned indentations 96, 98. A sensor 108 can be mounted to the cable receiving portion 80 to sense the position of a corresponding mark 118 disposed on the moveable portion 86 to stop the motion of the moveable portion 86 when the indentations 96, 98 are aligned. The sensor 108 is also used for counting the number of revolutions performed by the moveable portion 86 for maintenance purposes.

Additionally on FIGS. 4-6 is depicted a small ventilator 120 used in cooperation with the series of venting holes 70 disposed on the opposite side of the casing 52. The ventilator 120 helps channel air through the casing 52 to prevent overheating of the power pack 68 and the motor 122 inside the casing 52, that will be described in further details in Figures to come, that actuates the moveable portion 86. A switch 124 used to cut the electric current from the power pack 68 and a rotational speed adjustment 128 (not visible on FIG. 4) are also seen on the control panel 126.

Figure 7:
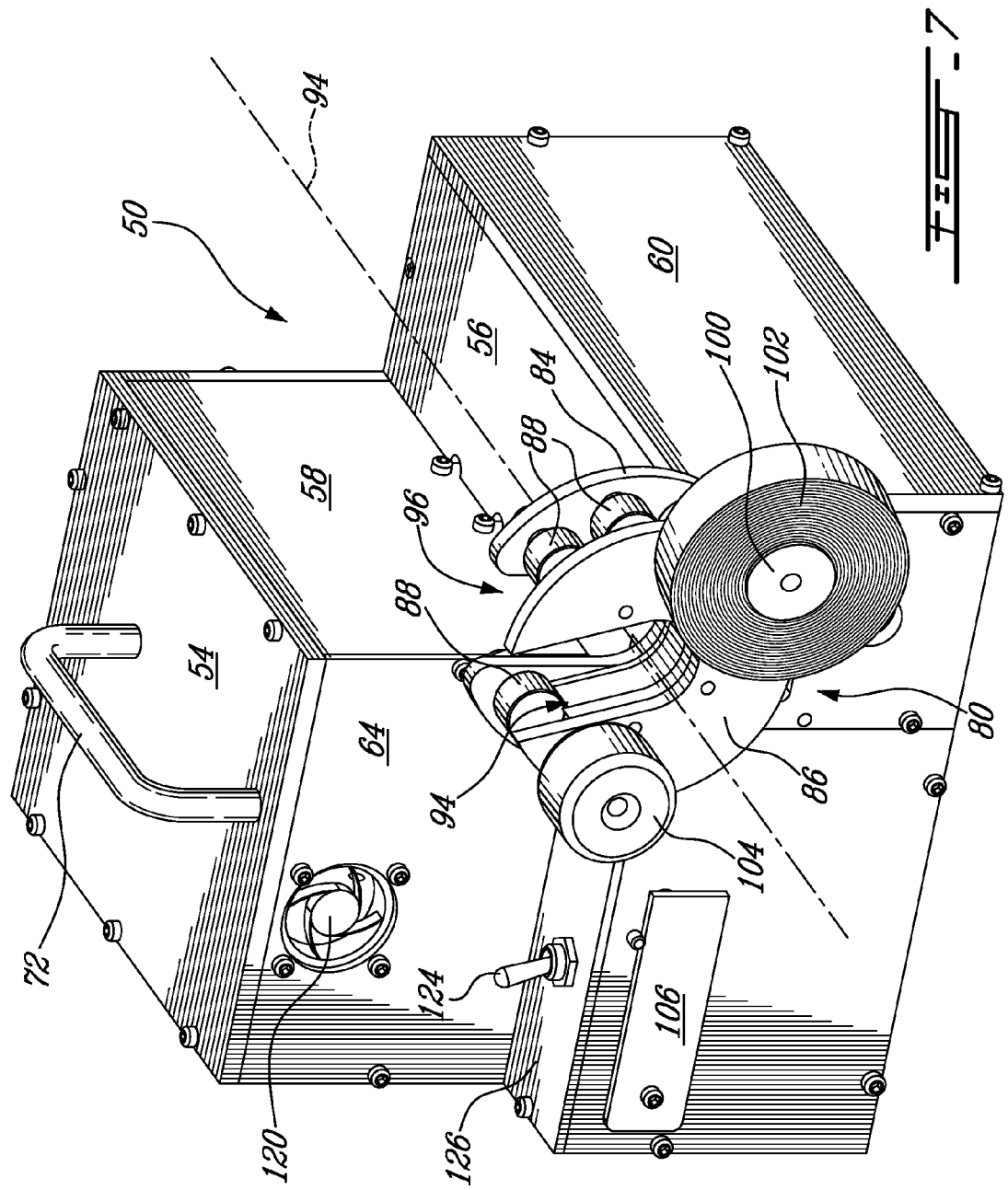
FIG. 7 is a perspective view of the taping machine of FIG. 2.

Turning now to FIG. 7 where is illustrated the taping apparatus 50 in a different angle so that the cable receiving portion 80 is not hidden by the casing 52. The cable receiving portion 80 is isolated and illustrated in an exploded view at FIG. 8.

Figure 8:
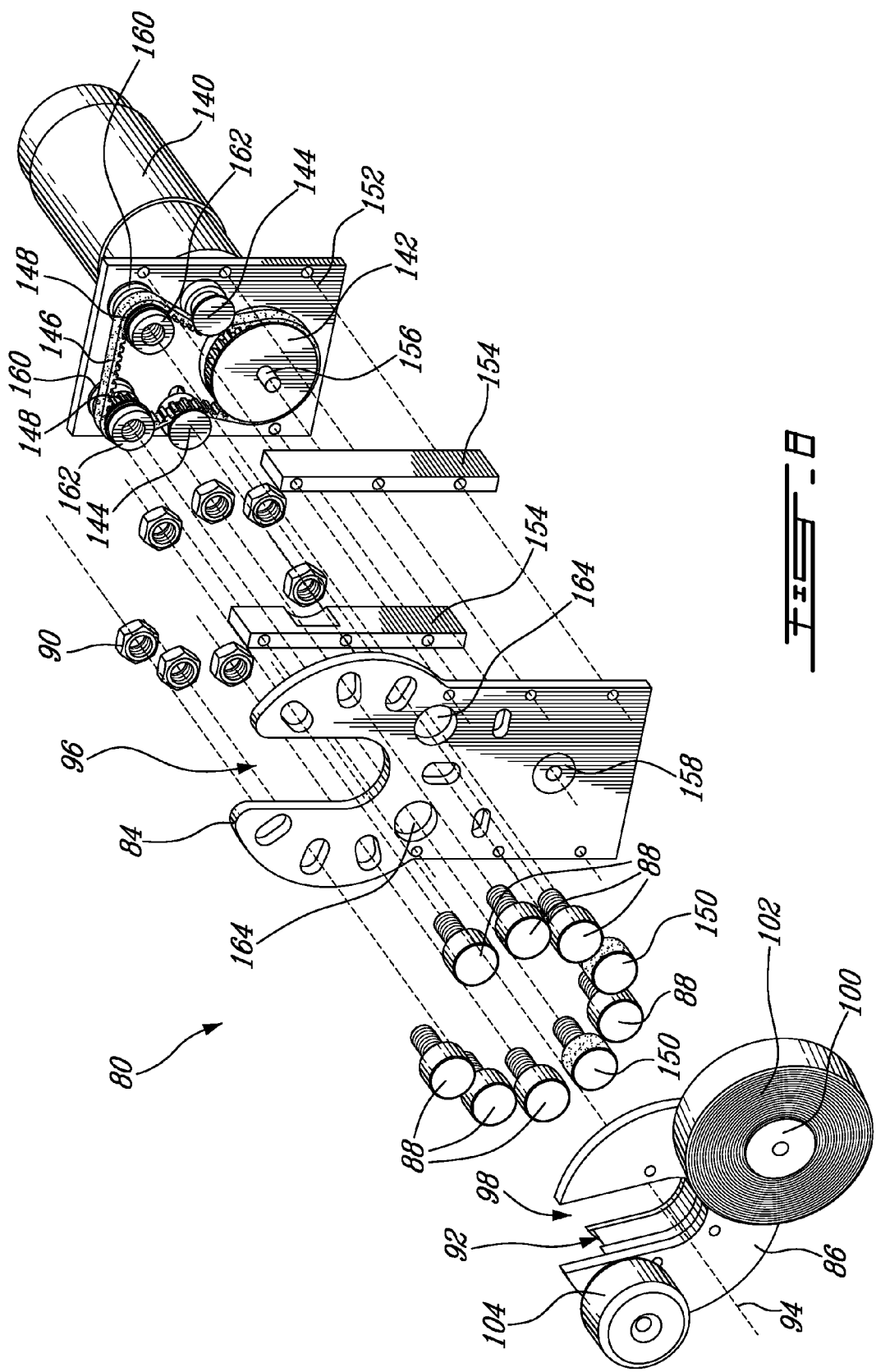
FIG. 8 is an exploded view of a portion of the taping machine of FIG. 7.
Figure 9:
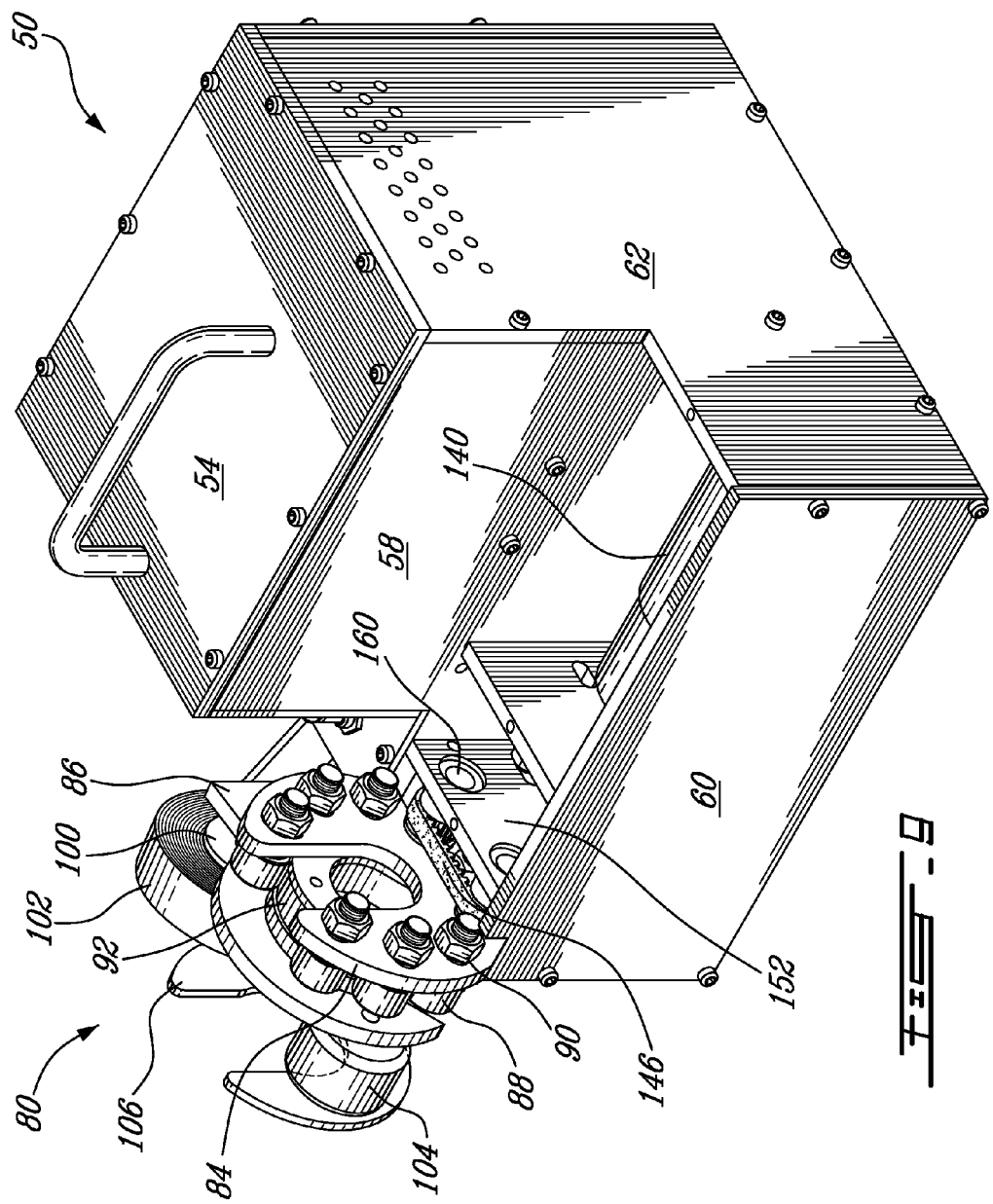
FIG. 9 is a perspective view of the taping machine of FIG. 2 with a removed portion of the casing.
Figure 10:
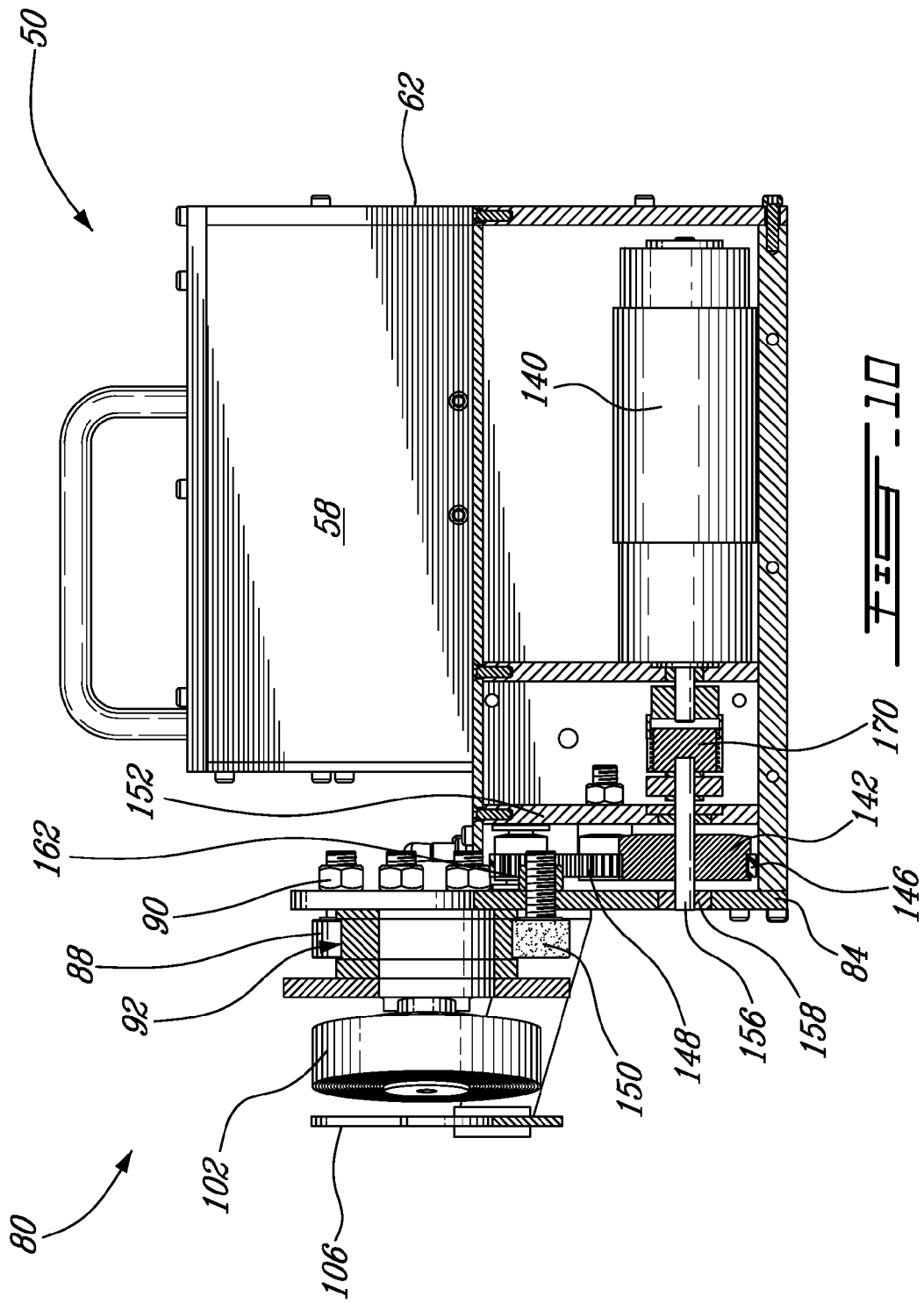
FIG. 10 is a front elevational view of the taping machine of FIG. 2 with a sectional view of the front face of the taping machine.
Figure 11:
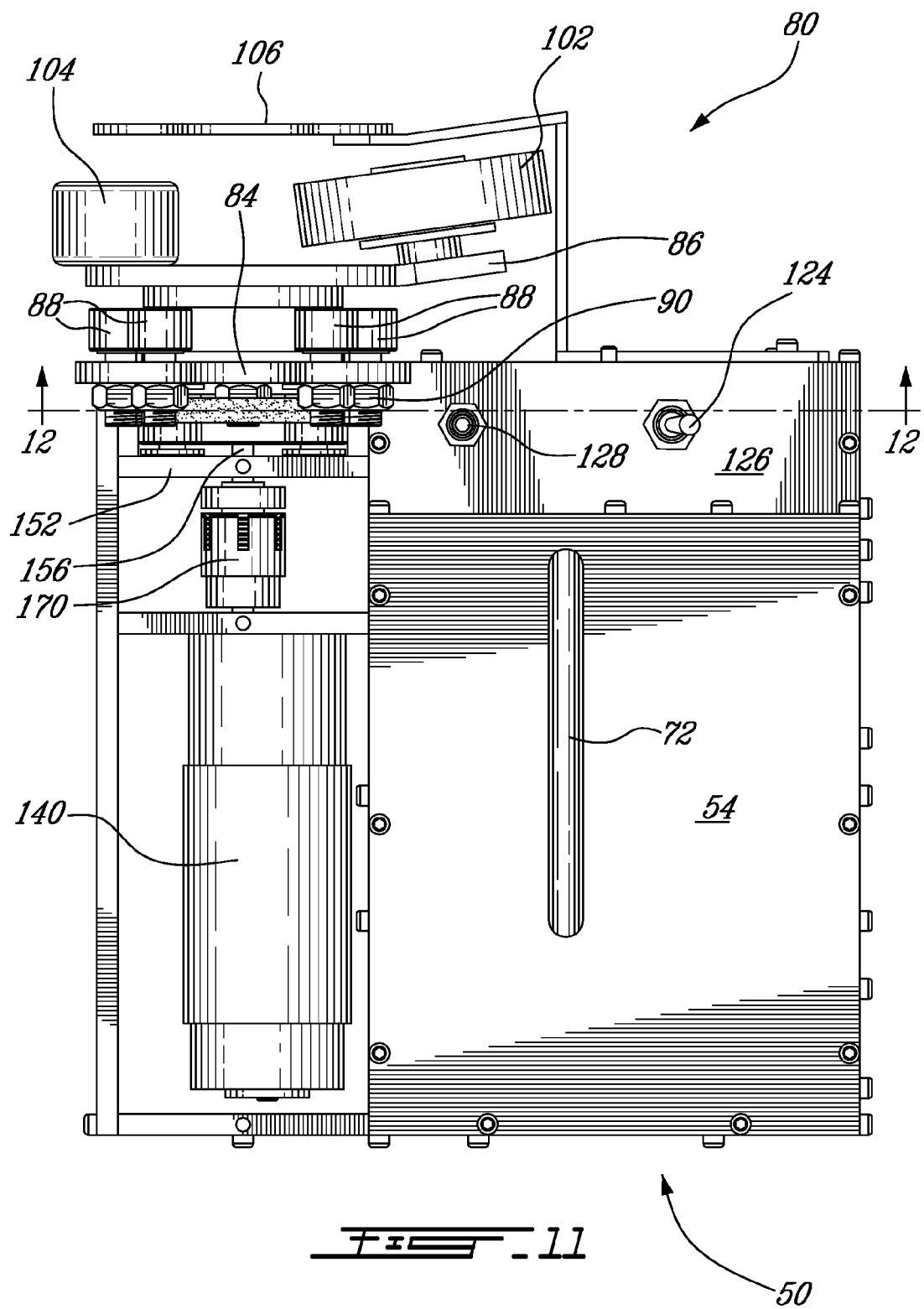
FIG. 11 is a top elevational view of the taping machine of FIG. 2 with a section of the casing removed to see a portion of the driving mechanism.
Figure 12:
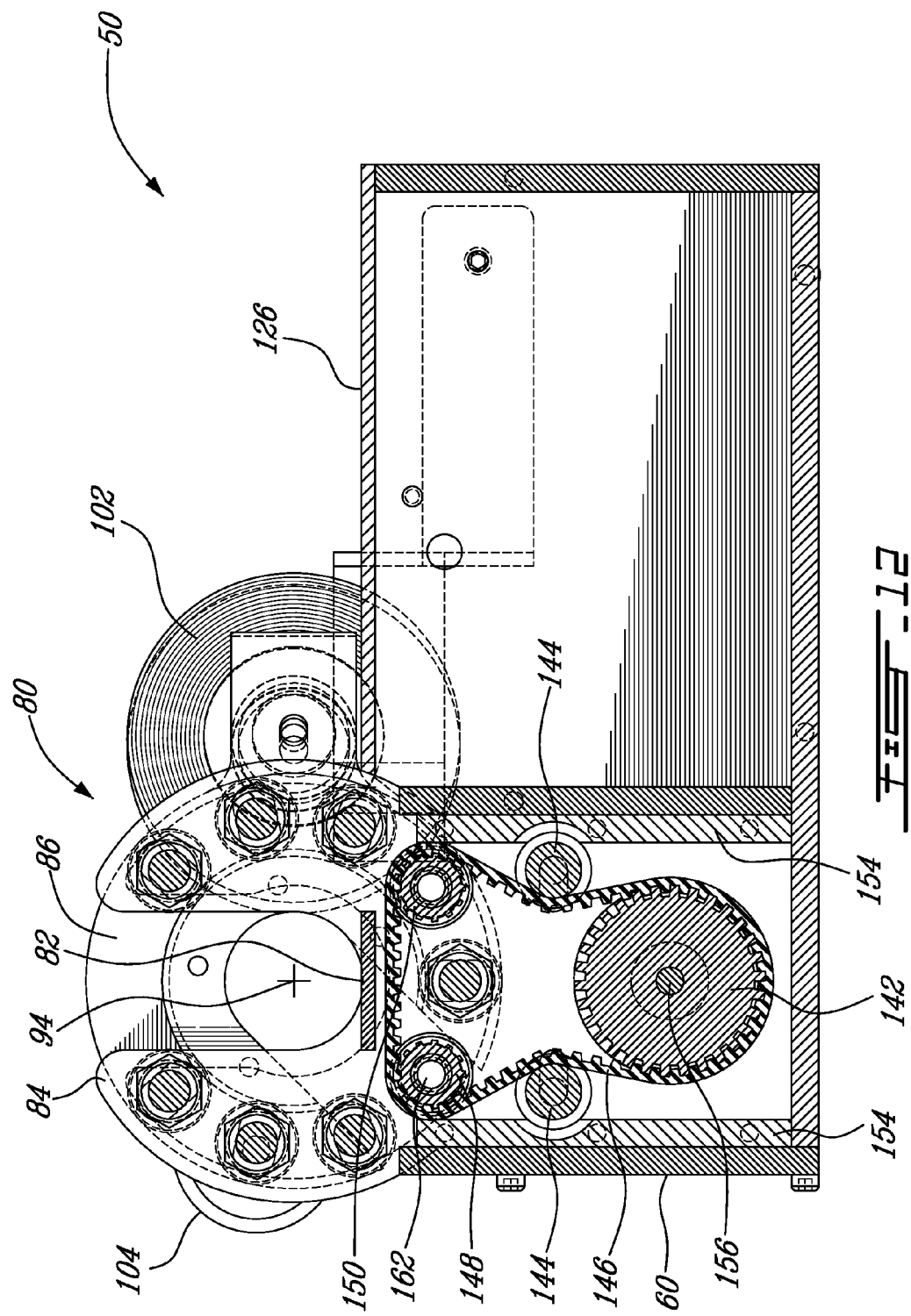
FIG. 12 is a right side elevational section view of the taping machine of FIG. 2.

The driving mechanism of the moveable portion 86 is better seen on the exploded view of FIG. 8 showing the motor 140, the drive gear 142, the tensioner 144, the endless belt 146 and the driven gears 148. All these parts are contained inside the casing 52 and are cooperating to transfer rotational power from the motor 140 to the moveable portion 86 via two drive wheels 150. The pair of drive wheels 150 is replacing two rollers 88 and is turning with the driven gears 148 in which they are engaged thereto. The drive wheels 150 preferably have the same size as the rollers 88 to fit in the circumferential guide 92 of the moveable portion 86. The exterior surface of the drive wheels 150 contacting the moveable portion 86 are preferably equipped with a friction enhancing surface ensuring good gripping to the moveable portion 86.

The motor 140, the drive gear 142, tensioner 144, the endless belt 146 and the driven gears 148 are mounted to a support 152 to ensure proper interactions among all the parts. The support 152 is spaced apart from the left side portion 64 with a pair of spacers 154 to allow sufficient space for the drive gear 142, tensioner 144, the endless belt 146 and the driven gears 148 assembly. The drive gear 142 is mounted to a shaft 156 adapted to fit into a bearing member 158 disposed into the lower portion of the fixed portion 84 thus preventing the drive gear 142 to be in cantilever. Additionally, the driven gears 148 are mounted on bearings 160 secured to the support 152. The driven gears 148 include a support bearing 162 adapted to engage corresponding openings 164 in the fixed portion 84. Therefore, when the motor 140 is powered, it turns the driven gears 148 that turn the two drive wheels 150 contacting the moveable portion 86 and rotating the moveable portion 86.

FIGS. 9-12 illustrate how the motor 140 and the other transmission parts are disposed into the casing 52. The motor 140 is located under the lower top portion 56 (the lower top portion is removed on FIG. 9 for a better understanding of the layout). It can be appreciated from FIG. 10 that the motor 140 is connected to the drive gear 142 using a coupling 170 helping to reduce vibration transfer between the engine and the rest of the cable receiving portion 80 and to ease removal of the motor 140 for maintenance.

The taping apparatus 50 is optionally provided with a clutch (not illustrated on the Figures) intervening between the motor 140 and the drive wheels 150. The optional clutch is preferably preset to a maximum torque as a safety measure in case the movable portion 86 is stopped while the taping apparatus 50 is powered. The clutch can be a well known dry friction clutch installed directly at the output of the motor 140.

Figure 13:
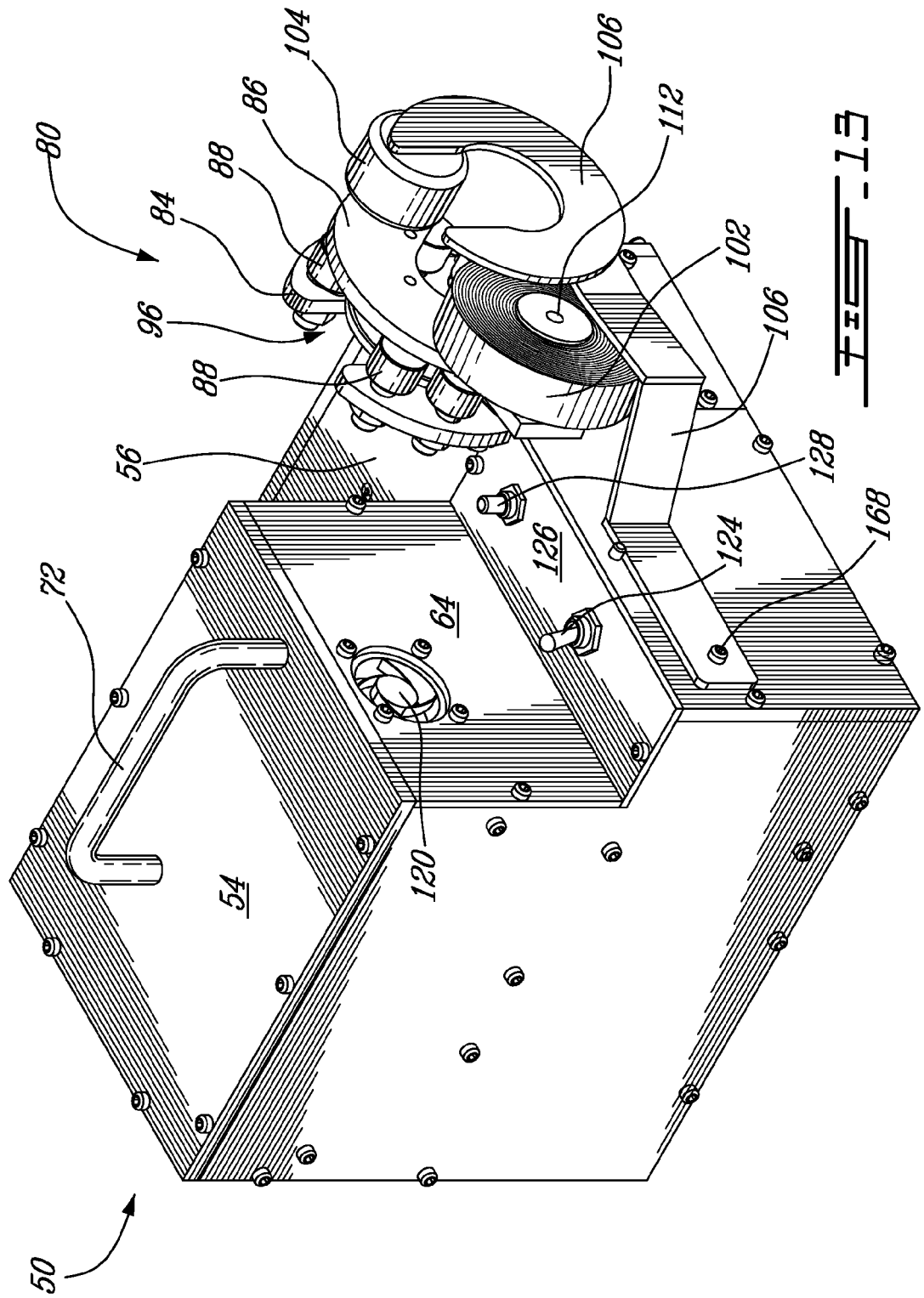
FIG. 13 is a perspective view of the taping machine of FIG. 2 partially viewed from behind.

Turning now to FIG. 13-15 where the focus is put on the safety lever 106. The safety lever 106 is adapted to prevent injuries of the user when the user uses his hand to position the wires 112 before the tape 114 is applied. The safety lever 106 pivots about pivot 168 in accordance with the movement indicated with arrow 166. A safety sensor (not visible) is actuated by the movement of the safety lever 106 to stop the movement of the moveable portion 80. A lateral movement of the safety lever 106 toward the left side portion 64 could also trigger the safety sensor to stop the taping apparatus 50.

Although the present invention has been described hereinabove by way of non-restrictive, illustrative embodiments thereof, these embodiments can be modified at will, within the scope of the appended claims, without departing from the spirit and nature of the subject invention.

The invention claimed is:

1. An apparatus for applying tape on a plurality of wires to form a harness thereof, the apparatus comprising:
a casing defining a fixed portion adapted to rotatably receive a moveable portion rotatable about a moveable portion axis,
the moveable portion being adapted to secure a roll of tape thereon such that the roll of tape revolves with the moveable portion in a fashion allowing unwinding of the tape on the plurality of wires,
the fixed portion and the moveable portion defining cooperating indentations encompassing the moveable portion axis, the indentation in the moveable portion being adapted to be selectively aligned with the indentation of the fixed portion to receive and allow positioning of the plurality of wires about the moveable portion axis such that the tape on the rotating moveable portion being unwounded on the plurality of wires to secure the plurality of wires in a harness,
the casing comprising a cable receiving portion and a lower top portion extending toward the fixed portion to reduce a gap formed there between to prevent wires from jamming.

2. The apparatus for applying tape of claim 1, wherein an array of rollers is disposed in an intervening fashion between the fixed portion and the moveable portion to connect the moveable portion to the taping apparatus.

3. The apparatus for applying tape of claim 2, wherein at least one roller is a drive wheel operatively connected to a motor, the drive wheel being adapted to transmit rotational motion from the motor to the moveable portion.

4. The apparatus for applying tape of claim 3, wherein the drive wheel is provided with a friction enhancing material improving the friction between the drive wheel and the moveable portion.

5. The apparatus for applying tape of claim 3, wherein an endless belt interconnects the motor to the drive wheel.

6. The apparatus for applying tape of claim 3, wherein a clutch interconnects the motor to the drive wheel.

7. The apparatus for applying tape of claim 2, wherein the array of rollers is radially disposed on the fixed portion in a plane normal to the moveable portion axis.

8. The apparatus for applying tape of claim 2, wherein the moveable portion further defines a circumferential guide adapted to receive the array of rollers therein to rotatably connect the moveable portion to the fixed portion.

9. The apparatus for applying tape of claim 1, wherein the moveable portion being further adapted to secure a roll of tape thereon such that an axis of the roll of tape is at an angle with the moveable portion axis.

10. The apparatus for applying tape of claim 1, wherein the moveable portion is adapted to receive a counterweight for counterbalancing a weight of the roll of tape when the moveable portion is rotating with the roll of tape.

11. The apparatus for applying tape of claim 1, further comprising a powerpack to provide the taping apparatus with off the electric grid autonomy.

12. The apparatus for applying tape of claim 11, wherein the powerpack is rechargeable by selectively connecting the power pack to the electric grid.

13. The apparatus for applying tape of claim 11, wherein the taping apparatus is provided with venting holes adapted to prevent heat building in the casing.

14. The apparatus for applying tape of claim 1, wherein the moveable portion is adapted to rotate at variable speed.

15. The apparatus for applying tape of claim 1, wherein rotation of the moveable portion is actuated with a foot-activated control.

16. The apparatus for applying tape of claim 1, wherein the taping apparatus is provided with a safety arm adapted to stop the rotation of the moveable portion when the operator contacts the safety arm.

17. The apparatus for applying tape of claim 1, wherein the moveable portion defines a doorless recess therein adapted to receive the plurality of wires therein, the recess being selectively accessible by rotating the moveable portion.

* * * * *